United States Patent [19]

Mandeville et al.

[11] Patent Number: 4,643,336
[45] Date of Patent: Feb. 17, 1987

[54] MIXING AND DISPENSING GUN

[75] Inventors: David C. Mandeville, Canton; David W. Lazar, Garden City, both of Mich.

[73] Assignee: Kent-Moore Corporation, Warren, Mich.

[21] Appl. No.: 678,274

[22] Filed: Dec. 5, 1984

[51] Int. Cl.$^4$ .............................................. B01F 5/00
[52] U.S. Cl. .................................... 222/145; 222/190; 239/432; 239/590.5; 366/339; 422/133; 422/135; 422/136
[58] Field of Search ................ 222/145, 190; 239/432, 239/590.5; 285/132 R, 157; 366/336, 337, 338, 340, 339; 422/133, 134, 135, 136

[56] References Cited

U.S. PATENT DOCUMENTS

| 1,782,380 | 11/1930 | Daley | 285/157 X |
| 3,704,006 | 11/1972 | Grout et al. | 366/339 X |
| 3,779,518 | 12/1973 | Koepke et al. | 366/339 X |
| 3,790,030 | 2/1974 | Ives | 222/145 X |
| 4,370,062 | 1/1983 | Moody | 239/432 X |
| 4,466,741 | 8/1984 | Kojima | 366/339 |

FOREIGN PATENT DOCUMENTS

| 299612 | 8/1965 | Netherlands | 285/157 |
| 190247 | 12/1966 | U.S.S.R. | 239/413 |
| 0804464 | 2/1981 | U.S.S.R. | 222/145 |

Primary Examiner—Joseph J. Rolla
Assistant Examiner—Frederick R. Handren
Attorney, Agent, or Firm—Barnes, Kisselle, Raisch, Choate, Whittemore & Hulbert

[57] ABSTRACT

A mixing and dispensing gun comprising a body having spaced inlets for receiving two components of an adhesive or reactive fluid, a dispensing valve in the gun, an outlet nozzle and a motionless mixer interposed between the dispensing valve and the outlet nozzle for directing the fluids in a sinuous path and mixing the fluids.

24 Claims, 12 Drawing Figures

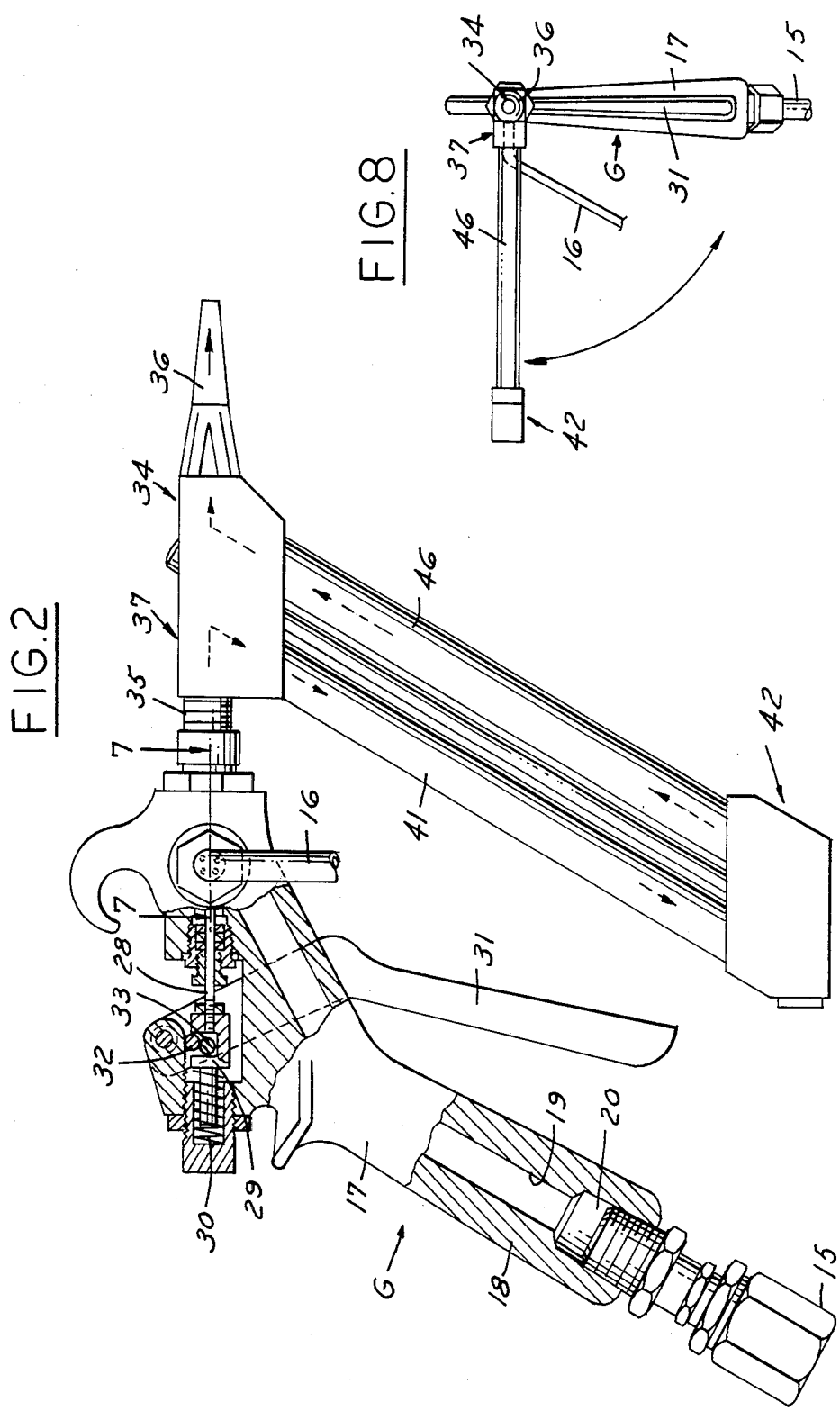

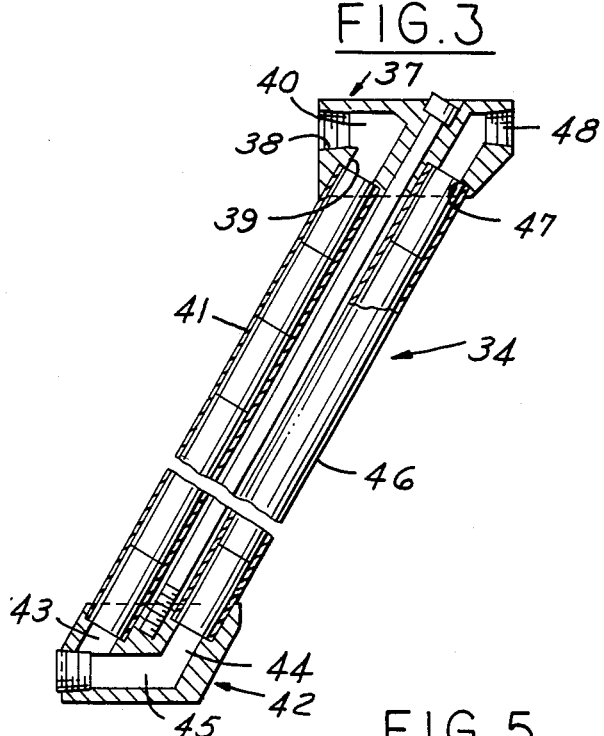
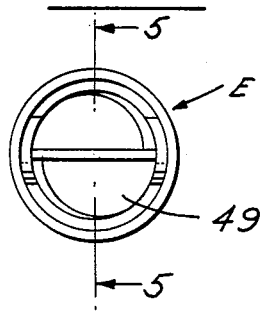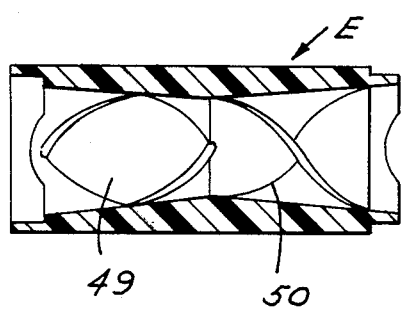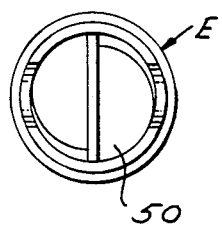
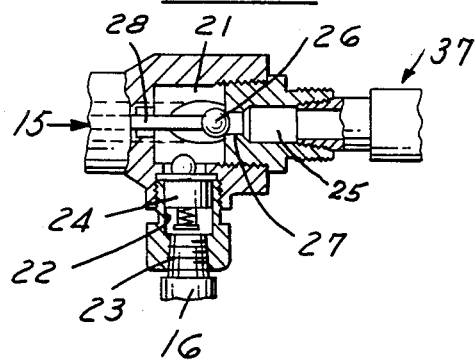

MIXING AND DISPENSING GUN

This invention relates to dispensing of two component fluids such as adhesive sealants and the like and particularly a dispensing gun for mixing and dispensing such fluids.

BACKGROUND AND SUMMARY OF THE INVENTION

In dispensing a fluid such as adhesive or sealant which is made up of two components, it is common to direct the two fluids to a pre-mixer and then to direct the components to a gun which has a dispensing valve for controlling the mixed fluid flow to an outlet nozzle.

Use of such a pre-mixer makes the system much more complex and cumbersome and results in waste in the portion of the fluids left in the pre-mixer or gun after mixing in instances where the mixed fluids are not immediately dispensed and which may remain in the pre-mixer or gun. Such material is not only wasted but necessitates taking the system apart and purging the mixed materials since they tend to cure and take a set.

In another type of system that has been proposed, a mixer is placed at the outlet of the gun and comprises an elongated body from which the mix material is directed to a nozzle. One of the problems with such an arrangement is that it makes the gun and system cumbersome.

Among the objectives of the present invention are to provide a gun which will both mix and dispense the fluids; which is less cumbersome than prior systems; which is shorter and which bring the nozzle and gun closer to the work surface; and which involves less waste and wherein what little waste there is can be readily cleaned without greatly affecting and dismantling the system.

In accordance with the invention, a mixing and dispensing gun comprises a body having spaced inlets for receiving two components of an adhesive or reactive fluid, a dispensing valve in the gun, an outlet nozzle and a motionless mixer interposed between the dispensing valve and the outlet nozzle for directing the fluids in a sinuous path and mixing the fluids before they pass to the nozzle.

DESCRIPTION OF THE DRAWINGS

FIG. 2 is a part sectional side elevational view of the mixing and dispensing gun.

FIG. 3 is a vertical sectional view through the motionless mixer utilized in connection with the mixing and dispensing gun.

FIG. 4 is an end view of the mixing elements utilized in the motionless mixer.

FIG. 5 is a sectional view taken along the line 5—5 in FIG. 4.

FIG. 6 is an opposite end view of the mixing element.

FIG. 7 is a fragmentary sectional view taken along the line 7—7 in FIG. 2.

FIG. 8 is a diagrammatic view showing how the mixer can be adjusted angularly with respect to the general plane of the gun.

DESCRIPTION

Figure 1:
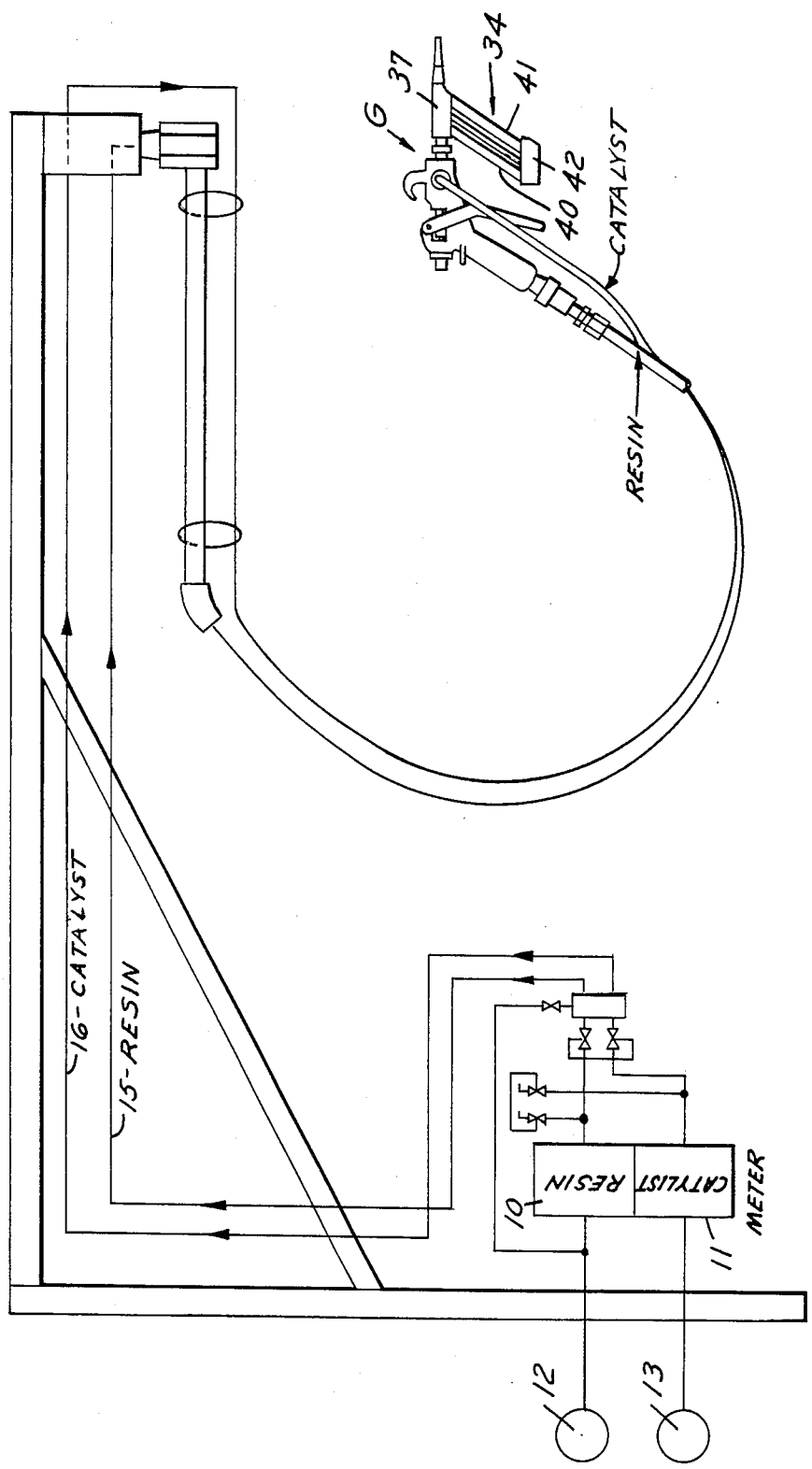
FIG. 1 is a partly diagrammatic view of a mixing and dispensing system embodying the mixing and dispensing gun of the present invention.

Referring to FIG. 1, the dispensing system embodying the invention comprises sources 10 and 11 of two fluids that need to be mixed before dispensing such as a resin and a catalyst and pumps 12 and 13 which direct the fluids from the sources 10 and 11 through lines 15 and 16 to a gun G.

As shown in FIGS. 2 and 7, the gun G comprises a body 17 including a handle portion 18 and a passage 19 having an inlet 20 through which the resin from line 15 is directed to a chamber 21. The body further includes a transverse passage 22 having an inlet 23 through which the other component, such as the catalyst, is directed past a one-way check valve 24. Valve 24 is spring loaded so that the other component may pass to chamber 21 but no fluids can pass outwardly through the check valve 24.

A dispensing valve is provided in the gun for controlling the dispensing of the fluid through an opening 25. The valve is of well known construction and may comprise, for example, a ball 26 which is seated against a seat 27 under the control of a rod 28 which is normally yieldingly urged against the ball 26 to close the seat 27 by a yoke 29 and spring 30. A trigger 31 is pivoted to the body and controls the movement of the rod 28 by engagement of transverse pins 32, 33 on the gun operating within the yoke 29. When the trigger is pulled, pin 32 first engages yoke 29 providing substantial leverage to overcome the pressure build-up on the valve, and as the trigger is further moved, pin 33 engages the yoke to further open the valve.

In accordance with the invention, a motionless mixer 34 is connected to the outlet of the gun by a threaded connector 35 and functions to direct the two fluids from the chamber through the motionless mixer 34 in a sinuous path, preferably a generally U-shaped path, as presently described, to a nozzle 36.

Referring to FIG. 3, the motionless mixer 34 includes a first adapter block 37 adjacent the connector 35 which has an inlet 38 and a first outlet 39 connected by a passage 40 for directing the fluid in a path that reverse in direction at least 90° and preferably more so that the axis of the inlet 38 to the axis of the outlet 40 is less than 90°. The motionless mixer further includes a first tube 41 extending from the outlet 39 of the first block to the inlet of a second adapter block 42. The second block 42 has an inlet 43 and outlet 44 extending parallel to one another and connected by a passage 45 which reverses the flow of the fluids after passage through the tube. A second tube 46 extends from the outlet 44 of the second block to a second inlet 47 in the first block and then to an outlet 48 in the first block 37 to the nozzle 36, the axis of the second inlet 43 to the second outlet 44 being greater than 90°. The two blocks are kept in assembled relation by a rod extending from first block 37 and threaded into the second block 42.

Each of the tubes 41, 46 is preferably provided with a plurality of tubular elements E made of synthetic plastic material, each of which includes a pair of helical vanes 49, 50 spiralled in opposite direction about the longitudinal axis of the element E. The tubular elements are disclosed and claimed in the copending application Ser. No. 559,254, filed Dec. 8, 1983, now U.S. Pat. No.

4,522,504, having a common assignee with the present invention, which is incorporated herein by reference. The ends of the tubular elements E are compressed to provide a seal preventing the fluids from leaking without the use of sealing rings or other seals.

The materials which are contacted by the fluids must be resistant and compatible with the two fluid components.

Although the gun has been described as using a valve controlled by a trigger, the valve can be controlled by an air motor, as is well known in the art.

In operation, the resin or major volume fluid enters from its metered supply line 15, through a straight or "Z" type swivel through the manual or automatic actuated flow gun G. The catalyst or minor volume fluid enters from its metered supply line 16, through check valve 23, and marries with the resin through a chamber 21 in the flow gun in advance or upstream of the shut-off seat 27. At the time of flow gun actuation, the two components marry and flow through the shut-off seat 27 and enter the motionless mixer 34. The fluid enters an adaptor block 37, turns 90° F. or more, enters the first motionless mix tube 41, enters the "V-Turn" adaptor block 42, enters the second motionless mix tube 46, re-enters the original adaptor block 37, turns 90° F. or less and exits as a homogenous mix to the nozzle 36. As shown, the mixer 34 also functions as a trigger guard.

As shown in FIG. 8, the mixer 37 can be angularly adjusted with respect to the general plane of the gun by merely rotating the mixer on the threaded connector 35 to provide access to the work surface of the fluid which is being delivered through the nozzle 36 as well as moving the mixer 37 or grasping the gun when necessary.

Figure 9:
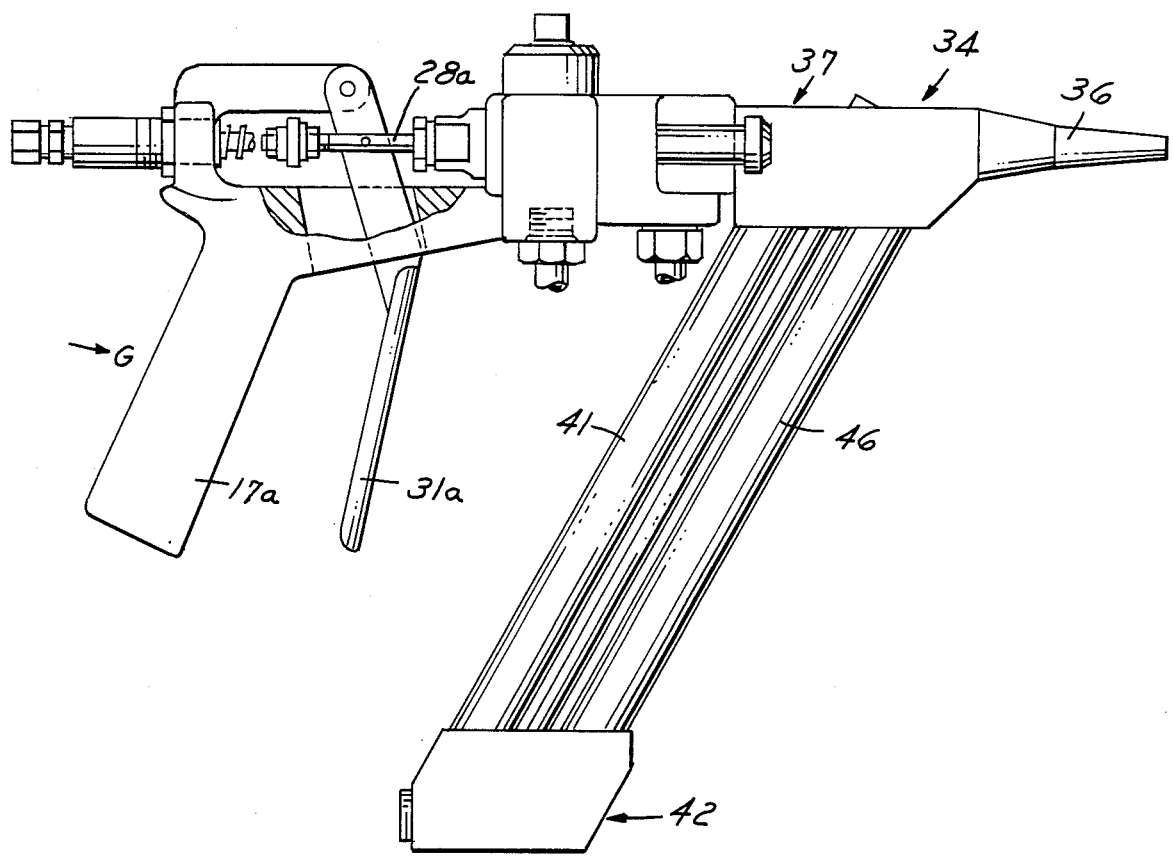
FIG. 9 is a part sectional side elevational view of a modified form of mixing and dispensing gun.
Figure 10:
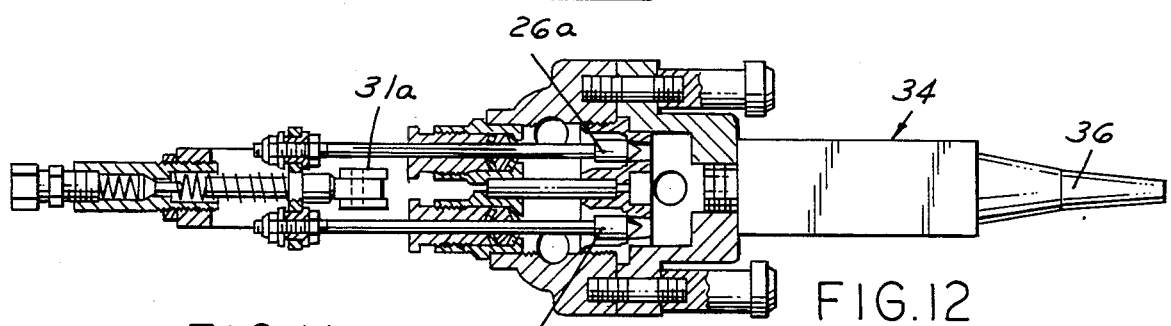
FIG. 10 is a fragmentary sectional view taken along the line 10—10 in FIG. 9.

As shown in FIGS. 9 and 10, the adapter 37 may also be attached to the outlet of a gun having two valves 26a, 26b similarly moved by a linkage from the trigger 31a. For purposes of clarity, corresponding parts are identified with identical numbers and subscripts.

Figure 11:
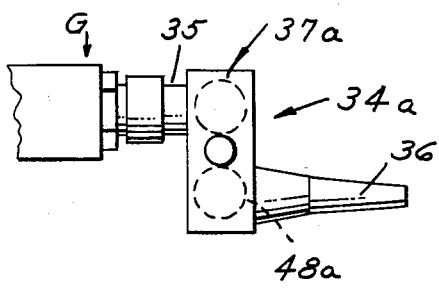
FIG. 11 is a diagrammatic plan view of a modified form of mixing and dispensing gun.
Figure 12:
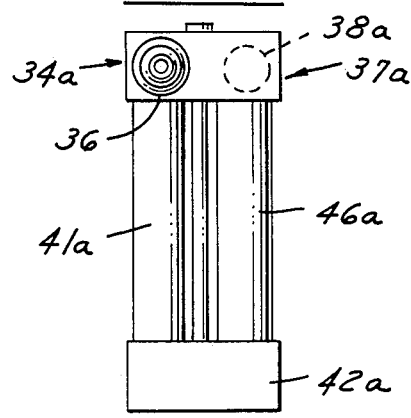
FIG. 12 is an elevational view taken along line 12—12 in FIG. 11.

In the form shown in FIGS. 11 and 12 diagrammatically, mixer 34a includes adapter block 37a having its plane changed such that the plane of the tubes 41a, 46a is at a right angle to the outlet 48a of the gun and the inlet 38a of the adapter is on the side of the mixer rather than on the end of the mixer. Similarly, the outlet 48a is on the opposite side and is connected to the nozzle 36. Such an arrangement provides the nozzle in an offset relation to the inlet to the adapter and facilitates the use of the mixing and dispensing gun in an arrangement wherein such a position of the nozzle is necessary for access to the work surface.

The advantages of the invention are:

1. Flow gun G has less total weight and is less cumbersome.

2. The total design length is linearly shorter for better control of fluid placement.

3. The motionless mixer placed after the flow gun dispenses significantly less "waste" material during "start-up" and "shut-down".

4. The compactness of the motionless mixer places the flow gun closer to the work surface for better control of fluid placement.

5. Whatever remains in the mixer can be readily purged by passing resin along through the mixer without catalyst.

6. The distance between the gun and nozzle is substantially shorter.

7. The angular position of the gun and mixer can be readily adjusted.

We claim:

1. A mixing and dispensing gun comprising
a body having spaced inlets for receiving two components of a reactive fluid and a single outlet,
a dispensing valve means in said body,
an outlet nozzle, and
a motionless mixing means interposed between the body and the outlet nozzle,
said motionless mixing means comprising an inlet connected to the outlet of said body and an outlet connected to said outlet nozzle and a first leg extending laterally from the inlet of the mixing means and the outlet of said body and having one end in fluid communication with said outlet of said body and a second leg extending laterally of said body and having one end in fluid communication with the other end of said first leg and the other end located adjacent said one end of said first leg and in fluid communication with the outlet of the mixing means and the outlet nozzle, said motionless mixing means further including means within the legs for directing the fluids from the body in a defined sinuous path and mixing the fluid prior to passage to the nozzle.

2. The mixing and dispensing gun set forth in claim 1 wherein said sinuous path generally directs the fluid in a U-shaped path to the nozzle.

3. The mixing and dispensing gun set forth in claim 2 wherein said first leg forms an acute angle with the inlet to the mixing means.

4. The mixing and dispensing gun set forth in claim 3 wherein said legs of said U-shaped path are parallel.

5. The mixing and dispensing gun set forth in claim 3 wherein said legs of said U-shaped path lie in substantially the same plane as the plane of the gun.

6. The mixing and dispensing gun set forth in claim 4 wherein the plane of said legs is at an angle to the general plane of the gun.

7. The mixing and dispensing gun set forth in any of claims 1–6 wherein said motionless mixing means comprises a plurality of tubular elements in each of said legs, each element including helical vanes.

8. The mixing and dispensing gun set forth in claim 7 wherein the helix of one vane is opposite to the direction of the helix of a succeeding vane.

9. The mixing and dispensing gun set forth in claim 1 wherein said dispensing valve means comprises a single valve.

10. The mixing and dispensing gun set forth in claim 1 wherein said dispensing valve means comprises a pair of valves operated substantially simultaneously.

11. The mixing and dispensing gun set forth in claim 1 wherein said motionless mixing means comprises a first adaptor block having a first inlet connected to the outlet of said body for receiving fluids from the body, a first outlet connected to said one end of said first leg, said first adaptor block having a second inlet and a second outlet spaced from said first inlet for directing fluids to said outlet nozzle,
a second adaptor block having an inlet and an outlet,
said first leg comprising a first tube connected to said first outlet of said first adaptor block and said inlet of said second adaptor block,
said second leg comprising a second tube connecting the outlet of said second block to said second inlet of said first block,
and motionless mixer means in each said tube, said second inlet of said first block communicating with said second outlet of said first block on which said nozzle is mounted.

12. The mixing and dispensing gun set forth in claim 11 wherein the axis of said first inlet of said first adaptor block forms an acute angle with the axis of the first outlet of said first adaptor block.

13. The mixing and dispensing gun set forth in claim 12 wherein said tubes are parallel to one another.

14. The mixing and dispensing gun set forth in claim 13 wherein the plane of said tubes is substantially in the general plane of the gun.

15. The mixing and dispensing gun set forth in claim 13 wherein the plane of said tubes forms an angle with the general plane of the gun.

16. The mixing and dispensing gun set forth in claim 1 wherein said mixer is adjustable angularly with respect to the general plane of the gun.

17. The mixing and dispensing gun set forth in claim 9 including a check valve in one of said inlets to said gun.

18. The mixing and dispensing gun set forth in claim 1 wherein one of said inlets is spaced in close proximity to the outlet of said body and upstream of said dispensing valve in said body.

19. The mixing and dispensing gun set forth in claim 18 including a check valve in said one inlet.

20. A motionless mixer comprising a first adaptor block having a first inlet for receiving fluids from a gun, a first outlet, a second inlet and a second outlet for directing fluids to a nozzle,
a second adaptor block having an inlet and an outlet,
a first tube connecting said first outlet of said first adaptor block and said inlet of said second adaptor block,
a second tube connecting the outlet of said second block to said second inlet of said first block,
said first and second tubes extending laterally of the flow paths defined by said first inlet and said second outlet
motionless mixer means in each said tube,
said second inlet of said first block communicating only by way of said tubes and said second adapter block with said second outlet of said first block on which said nozzle is mounted.

21. The motionless mixer set forth in claim 20 wherein the axis of said first inlet of said first adaptor block forms an acute angle with the axis of the first outlet of said first adaptor block.

22. The motionless mixer set forth in claim 21 wherein said tubes are parallel to one another.

23. The motionless mixer set forth in claim 22 wherein said tubes lie in a plane parallel to said first inlet of said first adaptor block and said second outlet of said first adaptor block.

24. The motionless mixer set forth in claim 22 wherein said tubes lie in a plane perpendicular to the plane of said first inlet of said first adaptor block and said second outlet of said first adaptor block.

* * * * *